United States Patent
Li (10) Patent No.: US 12,305,717 B2
(45) Date of Patent: May 20, 2025

(54) DOUBLE CARDAN CONSTANT VELOCITY ADJUSTABLE JOINT

(71) Applicant: STEERING SOLUTIONS IP HOLDING CORPORATION, Saginaw, MI (US)

(72) Inventor: Yong Li, Jiangsu (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 453 days.

(21) Appl. No.: 17/735,979

(22) Filed: May 3, 2022

(65) Prior Publication Data

US 2023/0304537 A1 Sep. 28, 2023

(30) Foreign Application Priority Data

Mar. 28, 2022 (CN) .......................... 202210314118.6

(51) Int. Cl.
*F16D 3/33* (2006.01)
*F16C 11/06* (2006.01)

(52) U.S. Cl.
CPC ............ *F16D 3/33* (2013.01); *F16C 11/0652* (2013.01); *F16C 2326/06* (2013.01); *Y10S 464/905* (2013.01); *Y10T 403/32688* (2015.01); *Y10T 403/32704* (2015.01); *Y10T 403/32811* (2015.01)

(58) Field of Classification Search
CPC .... F16D 3/33; F16C 11/0652; F16C 2326/06; Y10S 464/905; Y10T 403/32688; Y10T 403/32704; Y10T 403/32811
USPC .......................................................... 464/118
See application file for complete search history.

(56) References Cited

U.S. PATENT DOCUMENTS

| | | | | |
|---|---|---|---|---|
| 1,774,679 A | * | 9/1930 | Swenson .................... | F16D 3/32 464/118 |
| 3,409,317 A | * | 11/1968 | Richards ............. | F16C 11/0619 403/131 |
| 5,433,667 A | * | 7/1995 | Schafer ..................... | F16D 3/32 464/118 |

* cited by examiner

*Primary Examiner* — Greg Binda
(74) *Attorney, Agent, or Firm* — Dickinson Wright PLLC (57) ABSTRACT

A double cardan constant velocity joint including a housing extending between a housing first end and a housing second end. A first yoke is pivotably coupled to the housing first end by a first spider. The first yoke extends between a first end having a socket and a second end configured for attachment to a first shaft. A second yoke is pivotably coupled to the housing second end by a second spider. The second yoke extends between a first end having a ball stud and a second end configured for attachment to a second shaft. A ball is disposed in the socket, wherein the ball has a recessed pocket for receipt of the ball stud. A biasing member is disposed in the recessed pocket to impart a bias on the ball, wherein pivotal movement of the first yoke and the second yoke causes the ball to translate in the socket.

16 Claims, 5 Drawing Sheets

DOUBLE CARDAN CONSTANT VELOCITY ADJUSTABLE JOINT

CROSS-REFERENCE TO RELATED APPLICATION

The present application claims priority to the Chinese Patent Application No. 2022103141186 filed on Mar. 28, 2022, which is incorporated herein by reference in its entirety.

FIELD OF THE INVENTION

The present disclosure generally relates to constant velocity joints, and more specifically, to double cardan constant velocity joints.

BACKGROUND OF THE INVENTION

Automotive vehicles are known to include double cardan constant velocity joints for a variety of applications, such as steering applications, for example. Double cardan constant velocity joints allow two separated shafts to be coupled to one another via separate spider members pivotably attached to a housing, such that the separate shafts can be pivoted relative to the housing and relative to one another. Although the double cardan constant velocity joints are effective to allow relative angular movement of the coupled shafts to one another, they are limited to the degree of relative pivotal movement of the coupled shafts to one another. One factor limiting the degree of relative pivotal movement of the coupled shafts to one another is that ends of the coupled shafts fixed to the housing via the spiders are prevented from moving axially relative to one another. Another factor limiting the degree of relative pivotal movement of the coupled shafts to one another is an inner wall surface of the housing being cylindrical, whereby the end of the coupled shafts are prevented from pivoting beyond a predetermine angle that brings the shaft ends into contact with the cylindrical inner wall surface.

What is needed is a double cardan constant velocity joint that provides a greater range of pivotal movement of coupled shafts to one another, while providing a long and useful life, that enhances the design options of a motor vehicle by allowing for an increased range of angular movement between coupled shafts, thereby allowing the couple shafts to be routed about neighbor vehicle components, that optimizes performance of the motor vehicle, and while reducing the overall cost thereof.

SUMMARY OF THE INVENTION

It is an object of the present disclosure to provide a double cardan constant velocity joint that overcomes at least some of the drawbacks discussed above with known double cardan constant velocity joints.

It is an object of the present disclosure to provide a double cardan constant velocity joint for automotive vehicle applications that overcomes at least some of the drawbacks discussed above with known automotive double cardan constant velocity joints.

It is a further object of the present disclosure to provide a double cardan constant velocity joint for automotive vehicle applications that is robust and durable in use, while having an increased range of pivotal movement of coupled shafts relative to one another.

According to these and other objects and advantages, an aspect of the present disclosure provides double cardan constant velocity joint including a housing having an annular wall extending between a housing first end and an opposite housing second end about a central axis, wherein the annular wall has an inner surface bounding a cavity. A first yoke is pivotably coupled to the housing first end by a first spider. The first yoke extends between a first end having a socket and a second end configured for attachment to a first shaft. A second yoke is pivotably coupled to the housing second end by a second spider. The second yoke extends between a first end having a ball stud and a second end configured for attachment to a second shaft. A ball is disposed in the socket, wherein the ball has a recessed pocket sized for receipt of the ball stud therein. A biasing member is disposed in the recessed pocket to impart a bias on the ball, wherein pivotal movement of one of the first yoke and the second yoke causes concurrent pivotal movement of the other of the first yoke and the second yoke via engagement of the ball stud with the ball, and further causes the ball to pivot in the socket.

In accordance with another aspect of the disclosure, the socket has a cylindrical sidewall extending to a ball seat. The ball is biased by the biasing member into engagement with the ball seat when the first yoke and the second yoke are in coaxially aligned relation with one another along the central axis.

In accordance with another aspect of the disclosure, the first yoke and the second yoke are pivotable to a maximum pivot angle relative to the central axis, wherein the ball translates in the socket when the first yoke and the second yoke pivot between the coaxially aligned relation with one another and the maximum pivot angle.

In accordance with another aspect of the disclosure, the ball is disengaged from the ball seat when the first yoke and the second yoke are pivoted to the maximum pivot angle, thus, facilitating an ability to maximize the maximum pivot angle.

In accordance with another aspect of the disclosure, the biasing member is biased to an axially compressed state when the first yoke and the second yoke are coaxially aligned with one another along the central axis, and the biasing member is extended to an axially expanded state when the first yoke and the second yoke are pivoted to the maximum pivot angle.

In accordance with another aspect of the disclosure, the biasing member can be provided as a coil spring, wherein the spring rate of the coil spring can be selected, as desired, to impart a desired bias force on the ball.

In accordance with another aspect of the disclosure, the ball seat can be formed from a plastic material, and further, can be formed as an insert with the cylindrical sidewall, with the insert being configured for fixation to the first yoke.

In accordance with another aspect of the disclosure, the ball can be formed from a plastic material, thereby reducing friction, cost and weight.

In accordance with another aspect of the disclosure, the inner surface of the annular wall of the housing has a central region between the housing first end and the housing second end, wherein the central region can be provided having an annular concave contour, thereby increasing the radially outward volume in which the first and second yokes can pivot and oscillate, thus, increasing the maximum working angle of the double cardan constant velocity joint.

In accordance with another aspect of the disclosure, the first spider is supported for pivoting and oscillating movement by a plurality of bearings adjacent the housing first end and the second spider is supported for oscillating movement by a plurality of bearings adjacent the housing second end.

In accordance with another aspect of the disclosure, a double cardan constant velocity joint constructed in accordance with the disclosure includes a housing having an annular wall extending between a housing first end and an opposite housing second end about a central axis, with the annular wall having an inner surface bounding a cavity. A first yoke is pivotably coupled to the housing first end by a first spider, with the first yoke extending between a first end having a socket and a second end configured for attachment to a first shaft. A second yoke is pivotably coupled to the housing second end by a second spider, with the second yoke extending between a first end having a ball stud and a second end configured for attachment to a second shaft. A ball is disposed for pivotal, translating movement in the socket, with the ball having a recessed pocket sized for receipt of the ball stud therein, wherein pivotal movement of one of the first yoke and the second yoke causes concurrent pivotal movement of the other of the first yoke and the second yoke via the engagement of the ball stud with the ball, which causes the ball to pivot and translate in the socket.

In accordance with another aspect of the disclosure, the socket has a cylindrical sidewall extending to a ball seat, with the ball being biased by the biasing member into engagement with the ball seat when the first yoke and the second yoke are in coaxially aligned relation with one another along the central axis.

In accordance with another aspect of the disclosure, the first yoke and the second yoke are pivotable to a maximum pivot angle relative to the central axis, wherein the ball translates in the socket when the first yoke and the second yoke pivot between the coaxially aligned relation with one another and the maximum pivot angle.

In accordance with another aspect of the disclosure, the ball is disengaged from the ball seat when the first yoke and the second yoke are pivoted to the maximum pivot angle.

In accordance with another aspect of the disclosure, the biasing member is biased to an axially compressed state when the first yoke and the second yoke are coaxially aligned with one another along the central axis, and the biasing member is extended to an axially expanded state when the first yoke and the second yoke are pivoted to the maximum pivot angle.

In accordance with another aspect of the disclosure, the biasing member can be provided as a coil spring.

In accordance with another aspect of the disclosure, the ball seat can be formed of plastic.

In accordance with another aspect of the disclosure, the ball can be formed of plastic.

In accordance with another aspect of the disclosure, the inner surface of the annular wall has a central region between the housing first end and the housing second end, with the central region having an annular concave contour.

In accordance with another aspect of the disclosure, the first spider is supported for oscillating movement by a plurality of bearings adjacent the housing first end and the second spider is supported for oscillating movement by a plurality of bearings adjacent the housing second end.

In accordance with another aspect of the disclosure, a method of increasing a maximum pivot angle of a double cardan constant velocity joint is provided. The method includes providing a housing having an annular wall extending between a housing first end and an opposite housing second end about a central axis, the annular wall having an inner surface bounding a cavity. Further, providing a first yoke extending along a first yoke central axis between a first end having a socket and a second end configured for attachment to a first shaft. Further, providing a second yoke extending along a second yoke central axis between a first end having a ball stud and a second end configured for attachment to a second shaft. Further yet, disposing a ball, having a recessed pocket, in the socket and disposing the ball stud in the recessed pocket. Further yet, coupling the first yoke to the housing first end by a first spider and coupling the second yoke to the housing second end by a second spider, wherein pivotal movement of one of the first yoke and the second yoke causes concurrent pivotal movement of the other of the first yoke and the second yoke via engagement of the ball stud with the ball, and further causes the ball to pivot and translate in the socket.

In accordance with another aspect of the disclosure, the method can further include disposing a biasing member in the recessed pocket to maintain a bias on the ball.

In accordance with another aspect of the disclosure, the method can further include configuring the biasing member to be axially compressed when the first yoke central axis and the second yoke central axis are in coaxially aligned relation with one another, and to be axially expanded when the first yoke central axis and the second yoke central axis are inclined relative to one another.

In accordance with another aspect of the disclosure, the method can further include providing the socket having a cylindrical sidewall extending to a ball seat and configuring the biasing member to impart a bias on the ball to maintain the ball in engagement with the ball seat when the first yoke central axis and the second yoke central axis are in coaxially aligned relation with one another, and to allow the ball to be disengaged from the ball seat when the first yoke central axis and the second yoke central axis are misaligned with one another.

In accordance with another aspect of the disclosure, the method can further include providing the inner surface of the annular wall having a central region between the housing first end and the housing second end, and providing the central region having an annular concave contour.

These and other objects, advantages and features will become readily apparent to one possessing ordinary skill in the art in view of the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
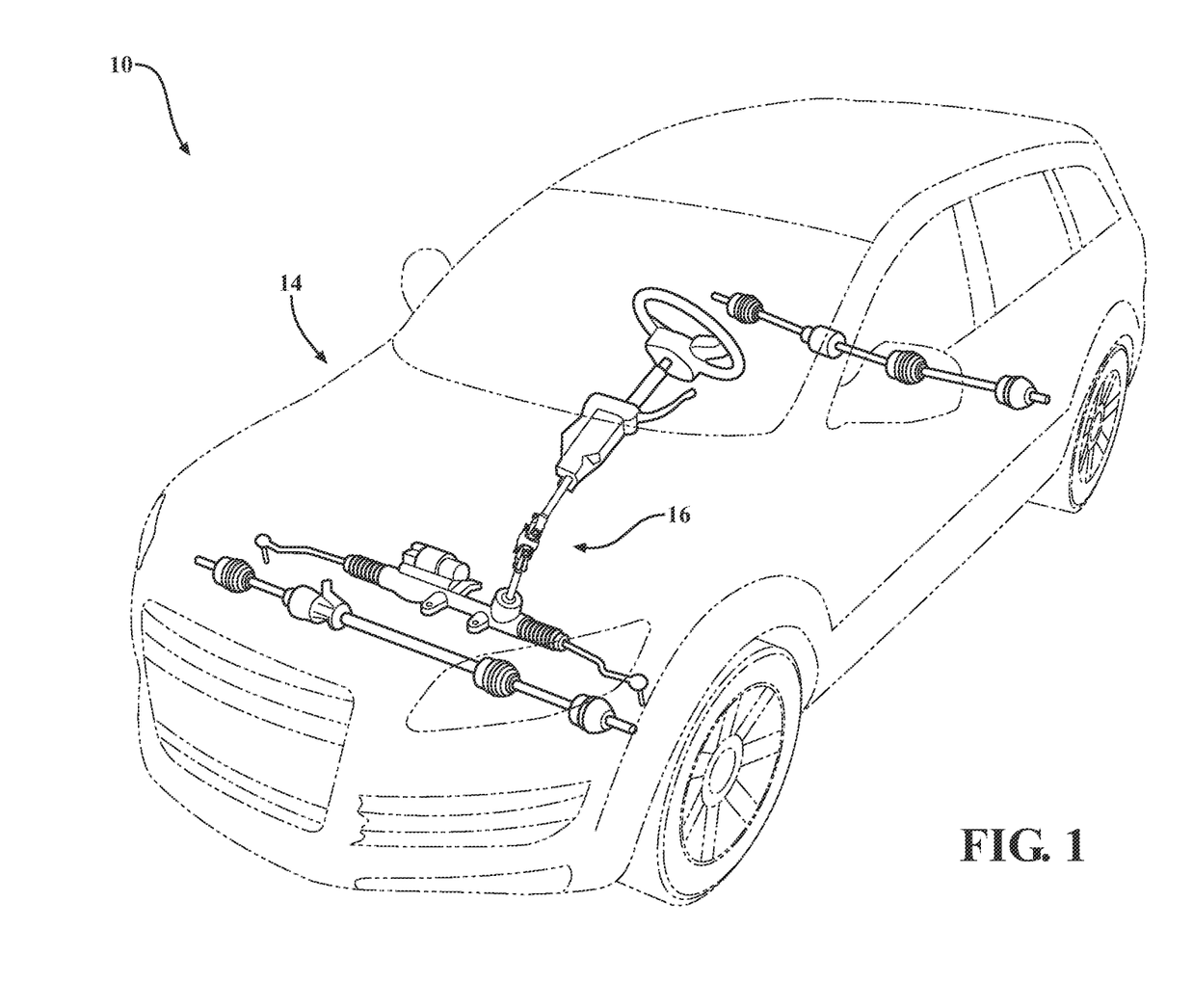
FIG. 1 is a perspective view of a motor vehicle having one or more double cardan constant velocity joints constructed in accordance with one aspect of the disclosure.
Figure 2:
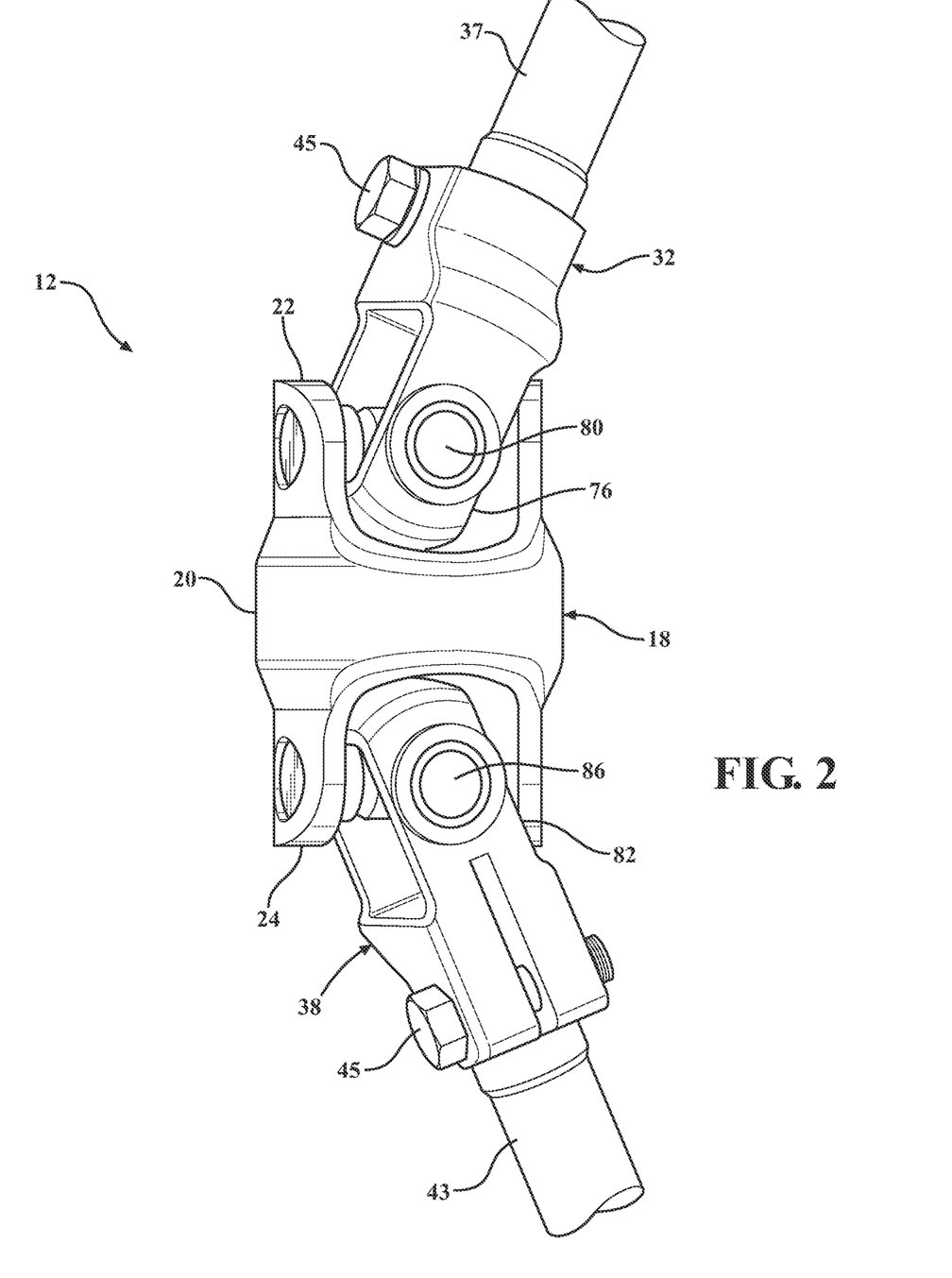
FIG. 2 is a side perspective view of a double cardan constant velocity joint of the motor vehicle of FIG. 1 constructed in accordance with one aspect of the disclosure.

Referring now to the Figures, where the invention will be described in greater detail with reference to specific embodiments, without limitation, FIG. 1 illustrates a motor vehicle 10 having one or a double cardan constant velocity joints, referred to hereafter as constant velocity joint or CVJ 12, such as may be incorporated into a steering system 14, and in particular, an intermediate shaft assembly 16, by way of example and without limitation. As best shown in FIGS. 2, 3, 4A, 4B, the CVJ 12 includes a housing 18 having an annular wall 20 extending between a housing first end 22 and an opposite housing second end 24 about a central axis 26. The annular wall 20 an inner surface 28 that circumferentially bounds a cavity 30. A first yoke 32 is pivotably coupled to the housing first end 22 by a first spider 33. The first yoke 32 extends between a first yoke first end, referred to hereafter as first end 34, having a socket 35 (FIGS. 4A and 4B) and a first yoke second end, referred to hereafter as second end 36, configured for attachment to a first shaft 37, shown as an upper intermediate shaft of intermediate shaft assembly 16, via a fastener 45 (e.g. bolt). A second yoke 38 is pivotably coupled to the housing second end 24 by a second spider 39. The second yoke 38 extends between a second yoke first end, referred to hereafter as first end 40, having a ball stud 41 (FIGS. 3, 4A, 4B and 5) and a second end 42 configured for attachment to a second shaft 43, shown as a lower intermediate shaft of intermediate shaft assembly 16, via a fastener 45 (e.g. bolt). A ball 44 is disposed in the socket 35, wherein the ball 44, as best identified in FIG. 5, has a recessed pocket 46 sized for sliding receipt of the ball stud 41 therein. A biasing member 48, such as a coil spring, by way of example and without limitation, is disposed in the recessed pocket 46 to impart a bias on the ball 44, wherein pivotal movement of one of the first yoke 32 and the second yoke 38 causes concurrent pivotal movement of the other of the first yoke 32 and the second yoke 38 via engagement of the ball stud 41 with an inner surface of the recessed pocket 46 of the ball 44, and wherein the biasing member 48 causes the ball 44 to pivot and remain seated in the socket 35. The biasing member 48 can retained by ball stud 41 as desired, such as by being disposed about a reduce diameter portion of an outer surface of ball stud 41, wherein biasing member 48 can confront a radial shoulder (not shown), or biasing member 48 can be disposed in a central bore 49 extending into an end of ball stud 41 (FIG. 5), with biasing member 48 extending outwardly from central bore 49 for biased engagement with ball 44.

Figure 4A:
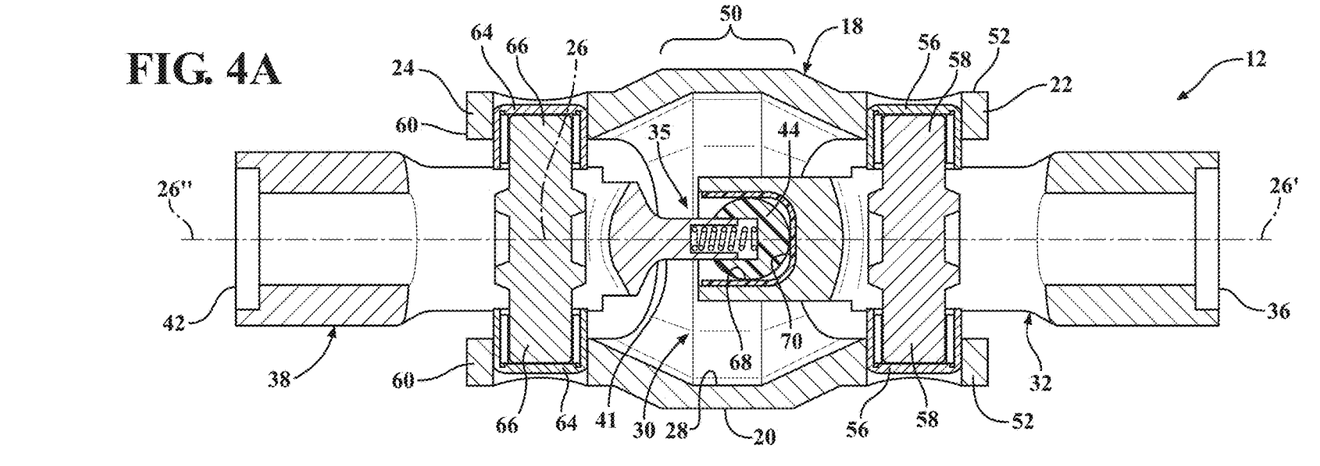
FIG. 4A is a side view of the double cardan constant velocity joint of FIG. 2 shown with a first yoke and a second yoke axially aligned with one another on opposite sides of a housing.
Figure 4B:
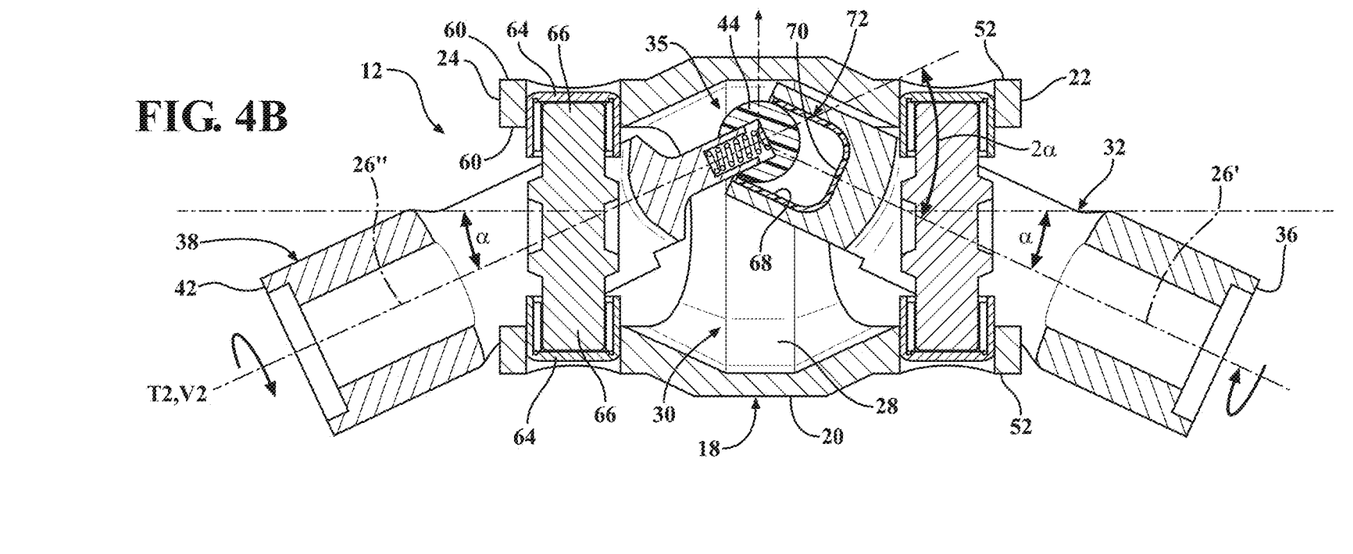
FIG. 4B is a view similar to FIG. 4A with the first yoke and the second yoke axially misaligned with one another in a maximum working angle of the double cardan constant velocity joint.

The housing 18 can be formed of any desired metal, including steel or aluminum, by way of example and without limitation. The inner surface 28 of the annular wall 20 extends over a central region 50, in which the first end 34 of the first yoke 32 and the first end 40 of the second yoke 38 pivot, between the housing first end 22 and the housing second end 24. The central region 50 has an annular concave contour, as best seen in FIGS. 4A and 4B. The concave contour expands the volume in which the first ends 34, 40 of the first and second yokes 32, 38 can pivot radially outwardly relative to the central axis 26. Accordingly, a maximum working angle α (FIG. 4B: angle of potential pivotal movement of the first and second yokes 32, 38 relative to the central axis 26) of each the first and second yokes 32, 38 is enhanced by an increased volume of space in which the respective first ends 34, 40 can freely move. The housing first end 22 is defined by a pair of diametrically opposite first bosses, also referred to as first ears 52 configured to support the first spider 33. The first ears 52 have receptacles, shown as through openings 54, sized for receipt of bearings 56 therein, such as, by way of example and without limitation, journal bearings, needle bearings, or roller bearings, wherein bearings 56 are configured for receipt of axles, also referred to as trunnions 58, of first spider 33 for low friction oscillation therein. The housing second end 24 is defined by a pair of diametrically opposite second bosses, also referred to as second ears 60 configured to support the second spider 39. The second ears 60 have receptacles, shown as through openings 62, sized for receipt of bearings 64 therein, such as, by way of example and without limitation, journal bearings, needle bearings, or roller bearings, wherein bearings 64 are configured for receipt of axles, also referred to as trunnions 68, of second spider 39 for low friction oscillation therein.

The socket 35 extending into first end 34 of first yoke 32 has a cylindrical sidewall 68 extending from a free end 69 bounding an opening to a base, also referred to as ball seat 70. In a non-limiting embodiment, the cylindrical sidewall 68 has an inner diameter sized for a slight, close loose fit with an outer diameter of ball 44, such that ball 44 can slide along cylindrical sidewall 68 from the free end 69 to the ball seat 70. Cylindrical sidewall 68 and ball seat 70 can be formed as a separate insert 72 (FIG. 3) of a different material from the first yoke 32, wherein the first yoke 32 can be formed of a metal, such a cast, machined or forged metal, and the insert 72 can be formed of a polymeric material, including a lubricious, low friction, bearing grade plastic. Ball 44 can also be formed of a plastic material. Insert 72 can be fixed in a bore 74 (FIG. 3) extending into the first end 34 of first yoke 32, such as via a press fit and/or suitable adhesive, by way of example and without limitation. It is to be recognized that any suitable lubricant, such as grease, can be disposed in the socket 35 to minimize friction and noise between the ball 44 and socket 35.

Figures 3, 5:
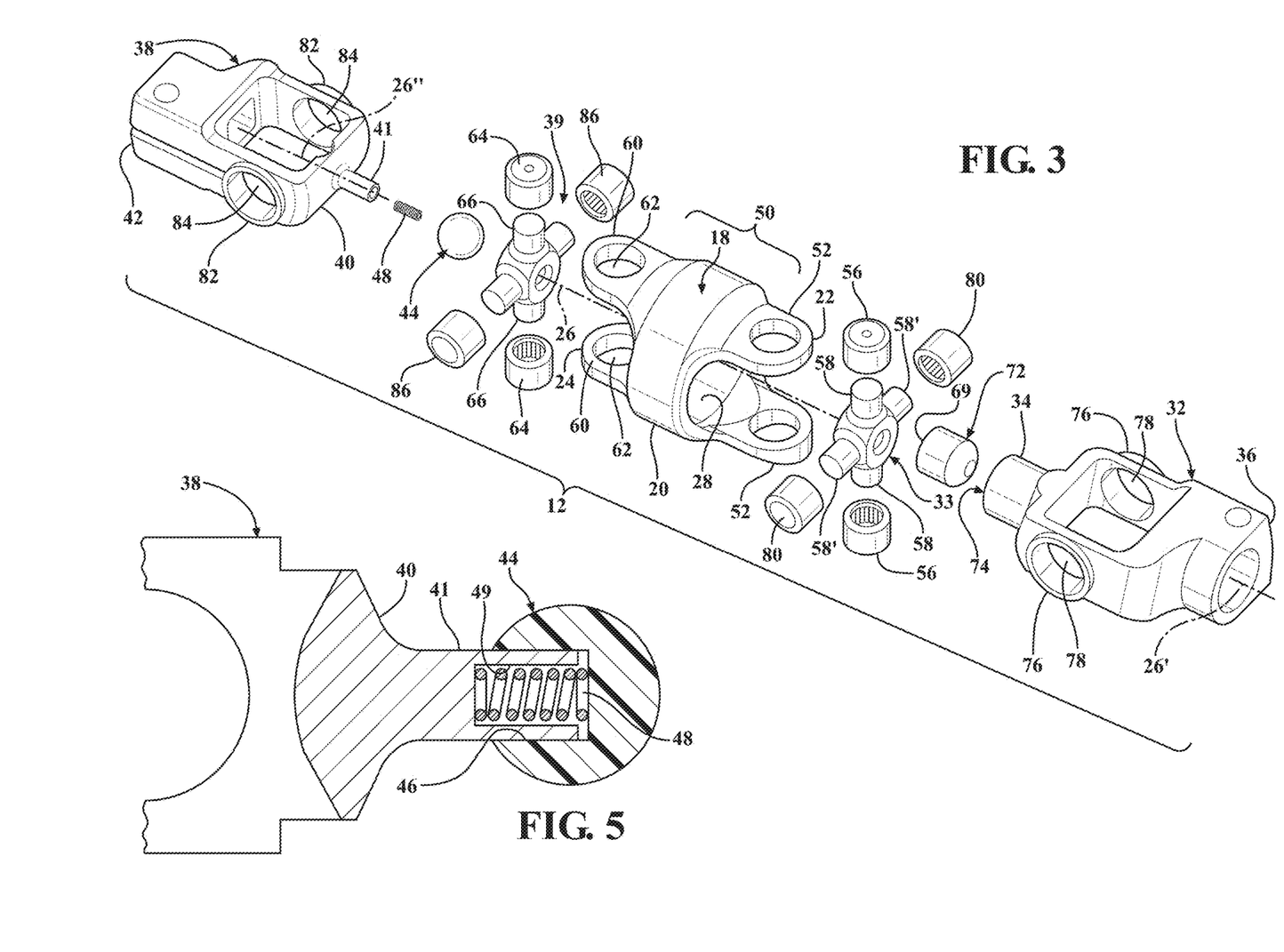
FIG. 3 is an exploded view of the double cardan constant velocity joint of FIG. 2.
FIG. 5 is a partial view of the second yoke illustrating a ball and biasing member assembled therewith in accordance with an aspect of the disclosure.

As best shown in FIG. 3, the first yoke 32 has a pair of flanges, also referred to as ears or bosses 76 spaced laterally from one another between first end 34 and second end 36. The bosses 76 have receptacles, shown as through openings 78, sized for receipt of bearings 80 therein, such as, by way of example and without limitation, journal bearings, needle bearings, or roller bearings, wherein bearings 80 are configured for receipt of for pivotal connection to axles, also referred to as trunnions 58', of first spider 33. Accordingly, first spider 33 couples first yoke 32 and housing first end 22 to one another, wherein first spider 33 is configured to allow pivotal and oscillating movement therebetween. Likewise, the second yoke 38 has a pair of flanges, also referred to as ears or bosses 82 spaced laterally from one another adjacent the first end 40. The bosses 82 have receptacles, shown as through openings 84, sized for receipt of bearings 86 therein, such as, by way of example and without limitation, journal bearings, needle bearings, or roller bearings, wherein bearings 86 are configured for receipt of for pivotal connection to axles, also referred to as trunnions 66', of second spider 39. Accordingly, second spider 39 couples second yoke 38 and housing second end 24 to one another, wherein second spider 39 is configured to allow pivotal and oscillating movement therebetween.

The ball 44 is biased by the biasing member 48 into engagement with the ball seat 70 when the first yoke 32 and the second yoke 38 are in coaxially aligned relation with one another along the central axis 26, such that longitudinal central axes 26' of the first and second yokes 32, 38 are coaxial with central axis 26, as shown in FIG. 4A. The first yoke 32 and the second yoke 38 are pivotable to a maximum pivot angle (FIG. 4B) relative to the central axis 26, such that the longitudinal central axes 26' of the first and second yokes 32, 38 are inclined concurrently with one another at the same angle α to central axis 26 of housing 18, and in an exemplary embodiment, by about 26 degrees, such that the maximum working angle (2α) of CVJ 12 is 52 degrees (included angle between longitudinal central axes 26' of the first and second yokes 32, 38). To facilitate attaining the increased maximum working angle 2α, the ball 44 translates in the socket 35, with and against the bias of biasing member 48, when the first yoke 32 and the second yoke 38 pivot between their coaxially aligned relation with one another (FIG. 4A) and the maximum pivot angle 2α (FIG. 4B). As the working angle increases, the ball 44 translates in the socket 35 against the bias of biasing member 48 to compress biasing member 48, and as the working angle decreases, the ball 44 translates in the socket 35 under the bias of biasing member 48 as biasing member axially expands to bring the ball 44 into seated engagement with the ball seat 70. The ball 44 becomes disengaged from the ball seat 70 when the first yoke 32 and the second yoke 38 are pivoted toward, and to the maximum pivot angle 2α, though, ball 44 remains in forcible engagement with sidewall 68.

Biasing member 48 is biased to an axially compressed state when the first yoke 32 and the second yoke 38 are coaxially aligned with one another along the central axis 26, and biasing member 48 is automatically extended via an internal bias within the biasing member 48 to an axially expanded state when the first yoke 32 and the second yoke 38 are pivoted to their maximum pivot angles α. When the first yoke 32 and the second yoke 38 are pivoted to their maximum pivot angles α, a bias remains imparted on the ball 44 by the biasing member 48, thereby keeping the ball 44 in forcible engagement with the cylindrical sidewall 68 (FIG. 4B), thereby maintaining the first end 34 of the first yoke 32 in coupled relation with the first end 40 of the second yoke 38, and further, acting to prevent vibration and noise from being generated.

Figure 6:
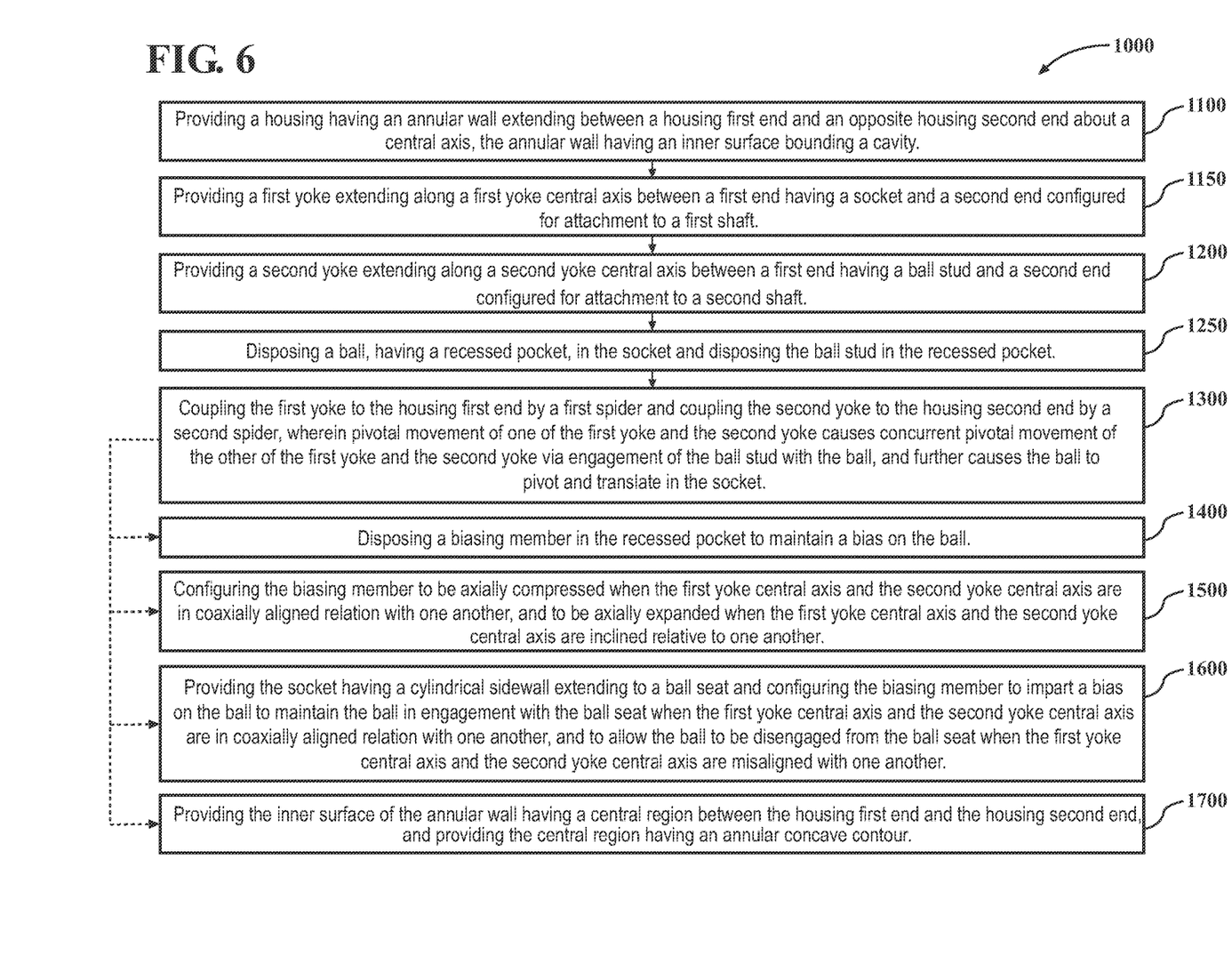
FIG. 6 is flow diagram illustrating a method of increasing a maximum pivot angle of a double cardan constant velocity joint in accordance with an aspect of the disclosure.

In accordance with a further aspect of the disclosure, a method 1000 of increasing a maximum pivot angle of a double cardan constant velocity joint 12 is provided. The method 1000 includes a step 1100 of providing a housing 18 having an annular wall 20 extending between a housing first end 22 and an opposite housing second end 24 about a central axis 26, with the annular wall 20 having an inner surface 28 bounding a cavity 30. The method 1000 further includes a step 1150 of providing a first yoke 32 extending along a first yoke central axis 26' between a first end 34 having a socket 35 and a second end 36 configured for attachment to a first shaft 37. Further, a step 1200 of providing a second yoke 38 extending along a second yoke central axis 26" between a first end 40 having a ball stud 41 and a second end 42 configured for attachment to a second shaft 43. A further step 1250 includes disposing a ball 44, having a recessed pocket 46, in the socket 35, and disposing the ball stud 41 in the recessed pocket 46. Further yet, a step 1300 includes coupling the first yoke 32 to the housing first end 22 by a first spider 33, and coupling the second yoke 38 to the housing second end 24 by a second spider 39, wherein pivotal movement of one of the first yoke 32 and the second yoke 38 causes concurrent pivotal movement of the other of the first yoke 32 and the second yoke 38 via engagement of the ball stud 41 with the ball 44, and further causes the ball 44 to pivot and translate in the socket 35.

In accordance with another aspect, the method 1000 can further include a step 1400 of disposing a biasing member 48 in the recessed pocket 46 to maintain a bias on the ball 44.

In accordance with another aspect, the method 1000 can further include a step 1500 of configuring the biasing member 48 to be axially compressed when the first yoke central axis 26' and the second yoke central axis 26" are in coaxially aligned relation with one another, and to be axially expanded when the first yoke central axis 26' and the second yoke central axis 26" are inclined relative to one another.

In accordance with another aspect, the method 1000 can further include a step 1600 of providing the socket 35 having a cylindrical sidewall 68 extending to a ball seat 70 and configuring the biasing member 48 to impart a bias on the ball 44 to maintain the ball 44 in engagement with the ball seat 70 when the first yoke central axis 26' and the second yoke central axis 26" are in coaxially aligned relation with one another, and to allow the ball 44 to be disengaged from the ball seat 70 when the first yoke central axis 26' and the second yoke central axis 26" are misaligned with one another.

In accordance with another aspect, the method 1000 can further include a step 1700 of providing the inner surface 28 of the annular wall 20 having a central region 50 between the housing first end 22 and the housing second end 24, and providing the central region 50 having an annular concave contour.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Individual elements or features of a particular embodiment are generally not limited to that particular embodiment, but, where applicable, are interchangeable and can be used in a selected embodiment, even if not specifically shown or described. Accordingly, the invention is not to be seen as limited by the foregoing description.

Having this described the invention, it is claimed:

1. A double cardan constant velocity joint, comprising:
a housing having an annular wall extending between a housing first end and an opposite housing second end about a central axis, said annular wall having an inner surface bounding a cavity;
a first yoke pivotably coupled to said housing first end by a first spider, said first yoke extending between a first end having a socket and a second end configured for attachment to a first shaft;
a second yoke pivotably coupled to said housing second end by a second spider, said second yoke extending between a first end having a ball stud and a second end configured for attachment to a second shaft;
a ball disposed in said socket, said ball having a recessed pocket sized for receipt of said ball stud therein; and a biasing member disposed in said recessed pocket to impart a bias on said ball, wherein pivotal movement of one of said first yoke and said second yoke causes concurrent pivotal movement of the other of said first yoke and said second yoke via said engagement of said ball stud with said ball, and further causes said ball to pivot in said socket, wherein said socket has a cylindrical sidewall extending to a ball seat, said ball being biased by said biasing member into engagement with said ball seat when said first yoke and said second yoke are in coaxially aligned relation with one another along said central axis.

2. The double cardan constant velocity joint of claim 1, wherein said first yoke and said second yoke are pivotable to a maximum pivot angle relative to said central axis, wherein said ball translates in said socket when said first yoke and said second yoke pivot between said coaxially aligned relation with one another and said maximum pivot angle.

3. The double cardan constant velocity joint of claim 2, wherein said ball is disengaged from said ball seat when said first yoke and said second yoke are pivoted to said maximum pivot angle.

4. The double cardan constant velocity joint of claim 2, wherein said biasing member is biased to an axially compressed state when said first yoke and said second yoke are coaxially aligned with one another along said central axis, and said biasing member is extended to an axially expanded state when said first yoke and said second yoke are pivoted to said maximum pivot angle.

5. The double cardan constant velocity joint of claim 4, wherein said biasing member is a coil spring.

6. The double cardan constant velocity joint of claim 1, wherein said ball seat is plastic.

7. The double cardan constant velocity joint of claim 6, wherein said ball is plastic.

8. The double cardan constant velocity joint of claim 1, wherein said inner surface of said annular wall has a central region between said housing first end and said housing second end, said central region having an annular concave contour.

9. A double cardan constant velocity joint, comprising:
a housing having an annular wall extending between a housing first end and an opposite housing second end about a central axis, said annular wall having an inner surface bounding a cavity;
a first yoke pivotably coupled to said housing first end by a first spider, said first yoke extending between a first end having a socket and a second end configured for attachment to a first shaft;
a second yoke pivotably coupled to said housing second end by a second spider, said second yoke extending between a first end having a ball stud and a second end configured for attachment to a second shaft;
a ball disposed in said socket, said ball having a recessed pocket sized for receipt of said ball stud therein; and
a biasing member disposed in said recessed pocket to impart a bias on said ball,
wherein pivotal movement of one of said first yoke and said second yoke causes concurrent pivotal movement of the other of said first yoke and said second yoke via said engagement of said ball stud with said ball, and further causes said ball to pivot in said socket,
wherein said first spider is supported for oscillating movement by a plurality of bearings adjacent said housing first end and said second spider is supported for oscillating movement by a plurality of bearings adjacent said housing second end.

10. A double cardan constant velocity joint, comprising:
a housing having an annular wall extending between a housing first end and an opposite housing second end about a central axis, said annular wall having an inner surface bounding a cavity;
a first yoke pivotably coupled to said housing first end by a first spider, said first yoke extending between a first end having a socket and a second end configured for attachment to a first shaft;
a second yoke pivotably coupled to said housing second end by a second spider, said second yoke extending between a first end having a ball stud and a second end configured for attachment to a second shaft;
a ball disposed for pivotal, translating movement in said socket, said ball having a recessed pocket sized for receipt of said ball stud therein,
wherein pivotal movement of one of said first yoke and said second yoke causes concurrent pivotal movement of the other of said first yoke and said second yoke via said engagement of said ball stud with said ball, and further causes said ball to pivot and translate in said socket,
wherein said socket has a cylindrical sidewall extending to a ball seat, said ball moving into engagement with said ball seat when said first yoke and said second yoke are in coaxially aligned relation with one another along said central axis and moving out of engagement from said ball seat when said first yoke and said second yoke are in misaligned relation with one another relative to said central axis; and
a biasing member imparting a bias on said ball to urge said ball into engagement with said ball seat when said first yoke and said second yoke are in coaxially aligned relation with one another.

11. The double cardan constant velocity joint of claim 10, wherein said biasing member is biased to an axially compressed state when said first yoke and said second yoke are coaxially aligned with one another along said central axis, and said biasing member is extended to an axially expanded state when said first yoke and said second yoke are pivoted toward a maximum pivot angle relative to said central axis.

12. A double cardan constant velocity joint, comprising:
a housing having an annular wall extending between a housing first end and an opposite housing second end about a central axis, said annular wall having an inner surface bounding a cavity;
a first yoke pivotably coupled to said housing first end by a first spider, said first yoke extending between a first end having a socket and a second end configured for attachment to a first shaft;
a second yoke pivotably coupled to said housing second end by a second spider, said second yoke extending between a first end having a ball stud and a second end configured for attachment to a second shaft; and
a ball disposed for pivotal, translating movement in said socket, said ball having a recessed pocket sized for receipt of said ball stud therein,
wherein pivotal movement of one of said first yoke and said second yoke causes concurrent pivotal movement of the other of said first yoke and said second yoke via said engagement of said ball stud with said ball, and further causes said ball to pivot and translate in said socket, wherein said inner surface of said annular wall has a central region between said housing first end and said housing second end, said central region having an annular concave contour.

13. A method of increasing a maximum pivot angle of a double cardan constant velocity joint, comprising:
providing a housing having an annular wall extending between a housing first end and an opposite housing second end about a central axis, the annular wall having an inner surface bounding a cavity;
providing a first yoke extending along a first yoke central axis between a first end having a socket and a second end configured for attachment to a first shaft;
providing a second yoke extending along a second yoke central axis between a first end having a ball stud and a second end configured for attachment to a second shaft;
disposing a ball, having a recessed pocket, in the socket;
disposing the ball stud in the recessed pocket;
coupling the first yoke to the housing first end by a first spider;
coupling the second yoke to the housing second end by a second spider,
wherein pivotal movement of one of the first yoke and the second yoke causes concurrent pivotal movement of the other of the first yoke and the second yoke via engagement of the ball stud with the ball, and further causes the ball to pivot and translate in the socket; and
disposing a biasing member in the recessed pocket to maintain a bias on the ball.

14. The method of claim 13, further including configuring the biasing member to be axially compressed when the first yoke central axis and the second yoke central axis are in coaxially aligned relation with one another, and to be axially expanded when the first yoke central axis and the second yoke central axis are inclined relative to one another.

15. The method of claim 14, further including providing the socket having a cylindrical sidewall extending to a ball seat and configuring the biasing member to impart a bias on the ball to maintain the ball in engagement with the ball seat when the first yoke central axis and the second yoke central axis are in coaxially aligned relation with one another, and to allow the ball to be disengaged from the ball seat when the first yoke central axis and the second yoke central axis are misaligned with one another.

16. The method of claim 13, further including providing the inner surface of the annular wall having a central region between the housing first end and the housing second end, and providing the central region having an annular concave contour.

* * * * *